May 15, 1928.   W. A. JOHNSON   1,669,939
NONSKID SHOE
Filed June 27, 1924   2 Sheets-Sheet 1

Inventor
William A Johnson
Daniel P Brennan
Attorney.

May 15, 1928.
W. A. JOHNSON
NONSKID SHOE
Filed June 27, 1924
1,669,939
2 Sheets-Sheet 2
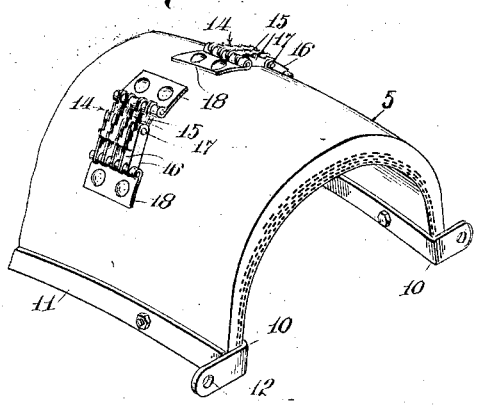
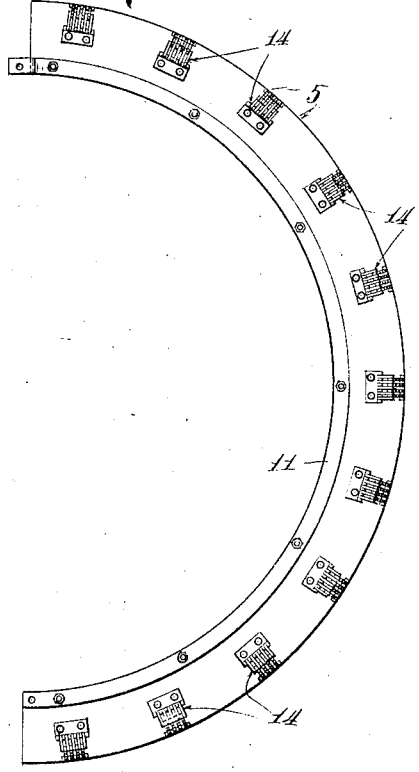
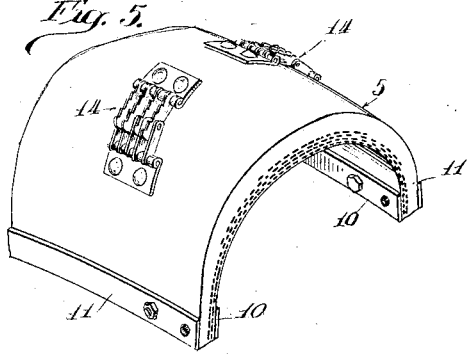
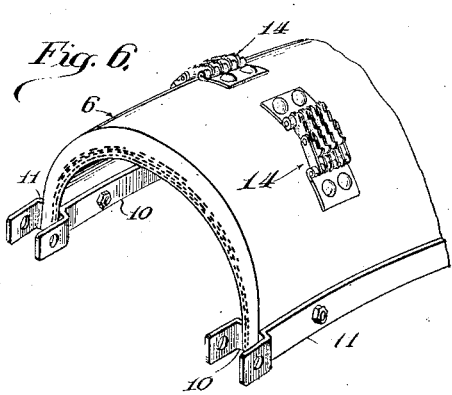
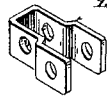
Inventor
William A. Johnson
By Daniel B. Brennan
Attorney.

Patented May 15, 1928.

1,669,939

UNITED STATES PATENT OFFICE.

WILLIAM A. JOHNSON, OF CHICAGO, ILLINOIS.

NONSKID SHOE.

Application filed June 27, 1924. Serial No. 722,649.

The invention relates to non-skid shoes, particularly adapted for use on automobiles.

An object of the invention is to provide a shoe that will be easily attachable and in which old automobile tires or the like may be utilized for making the shoes.

Another object of the invention is to provide a shoe with means insertible between the segments that will allow for discrepancies in the size of the tires, both as to diameter and cross section.

Another object of the invention is to provide a shoe with skid arresting and traction improving elements attached at either side of the longitudinal medial portion of the tires and out of engagement with the road during normal conditions, and which will engage the road if the car starts to skid, especially if there is a side sway set up while skidding or turning.

In the drawings:

Fig. 3 is a fragmental view of the preferred form of a segment with the skid-arresting means mounted thereon.

Fig. 4 is a modified form of the device shown in Fig. 1.

Fig. 5 is an enlarged fragmental view showing a portion of the segment illustrated in Fig. 4.

Fig. 6 is a fragmental view at enlarged scale of the opposite end of the segment shown in Fig. 5 or its companion segment.

Fig. 7 is a perspective view showing an extending element.

Figure 1:
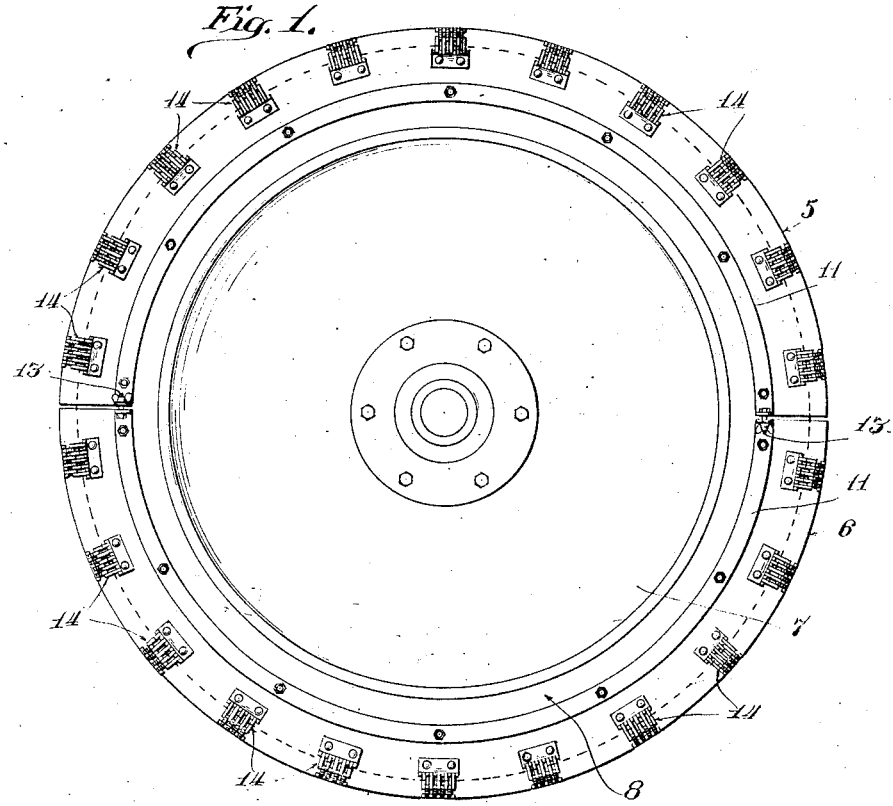
Fig. 1 is an assembled view showing the preferred form mounted on a disc wheel.
Figure 2:
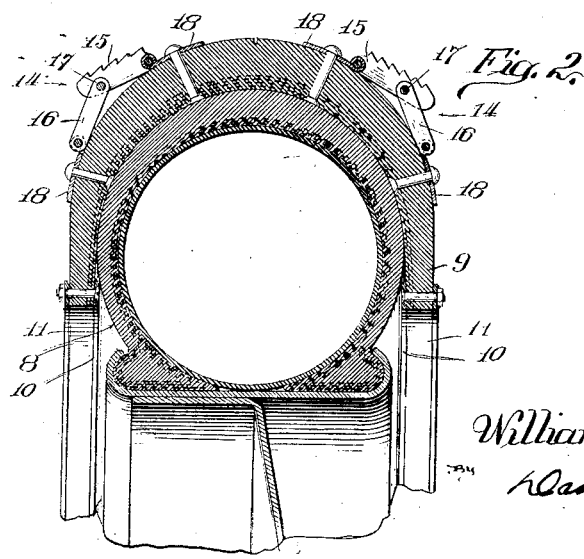
Fig. 2 is a cross-section of the preferred form shown at enlarged scale, disclosing the tire, non-skid shoe and a portion of the wheel.

The preferred form of the non-skid shoe illustrated in Figs. 1, 2 and 3, is made up of a plurality of segments 5 and 6 adapted to fit over an automobile tire to be utilized in rainy weather or at any time when additional traction or skid preventing means is necessary.

The disc wheel 7 is of ordinary conventional construction and has a standard pneumatic tire mounted thereon in the usual way. To form one of these shoe segments an old tire is taken and cut up into any number of desirable segments, then its inner diameter is reduced by cutting a portion of the tire away as shown at 9 Fig. 2, thus forming a shoe of substantially U-shaped cross section.

Annular metal strips 10 and 11 are secured along the inner and outer edges of the shoe respectively, and securely held thereto by means of bolts or any suitable fastening means. The inner annular strips 10, better illustrated in Fig. 3, have their ends bent outwardly at right angles to extend beyond the outer periphery of the shoe and have apertures 12 provided therein to register with the apertures in the bent portion of the outer segment reinforcing strips 11, and to receive holding means such as bolts or thumb-screws as illustrated at 13 in Figure 1.

Skid-arresting means 14 are mounted at intervals along the external walls of the shoes at either side of the longitudinal center line and preferably comprise a plurality of serrated links 15 and a plurality of non-serrated links 16 pivotally connected as at 17. Hinge brackets 18 are securerly fastened to the shoe by means of rivets or the like and so disposed that the non-skid links mounted therein will lie at an angle relative to each other at point 17 at which said links are pivotally connected such that this point will be elevated from the surface of the shoe and form the highest point of the skid arresting means.

While the car is riding over a smooth pavement, the skid arresting or traction increasing elements will not come in contact therewith, but when the car is travelling through sand or dirt, said sand and dirt will come in contact with the sides of these elements and thus increase the traction value.

It will also be noted that the serrations on the links are so formed that should the car tend to skid, the serrated edges will engage the road and prevent side-sway, due to the tire naturally having a tendency to be distorted at such time.

Since this non-skid shoe is usually made out of an old tire casing that has about outlived its usefulness, it becomes necessary at times to provide means of increasing the size of this shoe, both as to diameter and cross section, so that it will fit over another tire of its own original size after being stretched sufficiently.

By referring to the modification shown in Fig. 6, it will be seen that the reinforcing members 10 and 11 have their ends first bent inwardly and then outwardly parallel to each other and parallel to said reinforcing members to form means for receiving the extension members, 10 and 11 and are provided with apertures to register with like apertures in the extension member 19 to receive bolts or the like.

Extension member 19, illustrated in Fig. 7, is made of material similar to that of which the reinforcing members are made, and is so formed as to fit within the end portions of said reinforcing members. The outer or open end of said extension member is of increased size to fit over the outer sides of the adjacent segment and reinforcing members and has apertures provided therein to register with apertures in said members and to receive securing bolts or the like.

It is to be understood that I do not wish to be bound by the exact details as illustrated, for various changes are contemplated, but only to be bound within the scope of the specification and appended claims.

I claim:

1. In a non-skid shoe, a plurality of segments, means for connecting said segments, skid-arresting means comprising a plurality of serrated and non-serrated links pivotally connected to elements secured to said segments.

2. In a non-skid shoe, a plurality of segments, means for connecting said segments hinge brackets on said segments, and skid arresting means secured to said brackets.

3. In a non-skid shoe, a plurality of segments, means for detachably connecting said segments, hinge brackets on said segments and a plurality of pivotally connected links pivotally secured to said brackets.

4. In a non-skid shoe, a plurality of segments, means for connecting said segments, a plurality of hinge brackets arranged in pair on each side of the longitudinal medial portion of the segment, and non-skid shoes, each comprising linked sections, pivotally mounted on both sides of said medial portion in said brackets.

5. In a non-skid shoe, a plurality of segments, means for connecting said segments, a plurality of hinge brackets arranged in pair on each side of the longitudinal medial portion of the segment, and non-skid shoes, each comprising a serrated and a non-serrated link, pivotally mounted on both sides of said medial portion in said brackets.

6. In a non-skid shoe, a plurality of segments, means for connecting said segments, a plurality of hinge brackets arranged in pair on each side of the longitudinal medial portion of the segment, and non-skid shoes, each comprising a serrated and non-serrated link, pivotally mounted on both sides of said medial portion in said brackets, disposed angularly relative to each other, one end only of each link contacting the tire.

In testimony whereof I affix my signature at 10 South La Salle Street, Chicago, Illinois.

WILLIAM A. JOHNSON